(12) United States Patent
Liao et al.

(10) Patent No.: US 11,702,503 B2
(45) Date of Patent: Jul. 18, 2023

(54) CURING AGENT AND METHOD FOR MANUFACTURING THE SAME

(71) Applicant: NAN YA PLASTICS CORPORATION, Taipei (TW)

(72) Inventors: Te-Chao Liao, Taipei (TW); Sen-Huang Hsu, Taipei (TW); Chung-Chi Su, Taipei (TW); Chuan Chou, Taipei (TW); Jui-Jung Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 372 days.

(21) Appl. No.: 17/007,031

(22) Filed: Aug. 31, 2020

(65) Prior Publication Data

US 2021/0122876 A1 Apr. 29, 2021

(30) Foreign Application Priority Data

Oct. 28, 2019 (TW) ................. 108138883

(51) Int. Cl.
| | | |
|---|---|---|
| *C08L 79/02* | (2006.01) | |
| *C08G 59/50* | (2006.01) | |
| *C08G 59/42* | (2006.01) | |
| *C08L 71/08* | (2006.01) | |
| *C08G 65/34* | (2006.01) | |
| *C08G 65/00* | (2006.01) | |
| *C08L 63/00* | (2006.01) | |

(52) U.S. Cl.
CPC ..... *C08G 59/5013* (2013.01); *C08G 59/4276* (2013.01); *C08G 65/002* (2013.01); *C08G 65/34* (2013.01); *C08L 71/08* (2013.01)

(58) Field of Classification Search
None
See application file for complete search history.

(56) References Cited

U.S. PATENT DOCUMENTS

| | | | |
|---|---|---|---|
| 3,383,434 A * | 5/1968 | Carlston | ................. C08L 63/00 528/307 |
| 4,197,389 A | 4/1980 | Becker et al. | |
| 5,489,630 A | 2/1996 | Walker | |
| 6,013,757 A | 1/2000 | Corley et al. | |
| 6,127,459 A | 10/2000 | Stark et al. | |

FOREIGN PATENT DOCUMENTS

| | | | |
|---|---|---|---|
| CN | 1278844 A | 1/2001 | |
| CN | 103687889 A | 3/2014 | |
| CN | 104870509 A | 8/2015 | |
| CN | 105131525 A | 12/2015 | |
| CN | 105367755 A | 3/2016 | |
| CN | 106317381 A | 1/2017 | |
| JP | 09235354 A * | 9/1997 | .......... C08G 59/184 |
| TW | 201702285 A | 1/2017 | |
| TW | 201815868 A | 5/2018 | |

OTHER PUBLICATIONS

Machine translation of JP-09235354-A (no date).*

\* cited by examiner

*Primary Examiner* — Michael J Feely
(74) *Attorney, Agent, or Firm* — Li & Cai Intellectual Property (USA) Office

(57) ABSTRACT

A curing agent and method for producing the same are provided, the method includes: esterification reaction: reacting a polyhydric alcohol with a polybasic acid anhydride to obtain an ester-based emulsifier (A); chain extension reaction: reacting an ester-based emulsifier (A) with a bifunctional epoxy resin to obtain a polymer intermediate (B); and reacting the polymer intermediate (B) with a polyamine compound to obtain a curing agent (C).

12 Claims, 3 Drawing Sheets

CURING AGENT AND METHOD FOR MANUFACTURING THE SAME

CROSS-REFERENCE TO RELATED PATENT APPLICATION

This application claims the benefit of priority to Taiwan Patent Application No. 108138883, filed on Oct. 28, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a curing agent and a method of manufacturing the same, and more particularly to a curing agent and a method of manufacturing the same for an aqueous epoxy resin coating.

BACKGROUND OF THE DISCLOSURE

The cured product of epoxy resin composition has excellent mechanical properties, corrosion resistance, adhesion, etc. Therefore, it is widely used in coatings, adhesives, laminates, electronic parts and other fields. Epoxy resins have chemical resistance and have good adhesion to most substrates as well. However, conventional epoxy resins are generally insoluble in water and only soluble in organic solvents such as alcohols, ketones and aromatic hydrocarbons, etc., and usually must be applied in the condition of using a large amount of organic solvents.

With health and environmental pollution issues becoming more important to people, the impact of volatile organic solvents and volatile organic compounds (VOCs) on the human body and the environment has received increasingly attention. Specifically, VOCs can be organic compounds listed as volatile solvents according to U.S. Environmental Protection Agency (EPA) Method 24, or organic compounds listed as VOCs according to the European Union Directive2004/42/CE. For example, VOCs can be methanol, ethanol, propanol, isopropanol, acetoxysilane, 2-methoxyethanol and the like. Therefore, non-volatile organic compound (NVOC) or low volatility organic compounds have become relevant research subjects for epoxy resin materials.

U.S. Pat. No. 4,197,389 discloses a method for preparing a hardening agent: reacting at least one polyepoxide compound with at least one polyalkylene polyether polyol to form an adduct that is subsequently reacted with a polyamine. U.S. Pat. No. 5,489,630 discloses a water-compatible polyamine-epoxy resin adduct, through reacting poly (alkylene oxide) monoamine or diamine with polyepoxide to form an intermediate, and the intermediate is then reacted with excess polyamine U.S. Pat. No. 6,013,757 discloses an aqueous polyamide curing agent prepared by the reaction of a long-chain dicarboxylic acid and aminoalkylpiperazine. U.S. Pat. No. 6,127,459 discloses a reaction of polyamines and epoxy resins to produce an amine end-group intermediate, and the amine end-group intermediate is further reacted with the compounds (I), (II), (III) illustrated below to produce an amine terminated curing agent.

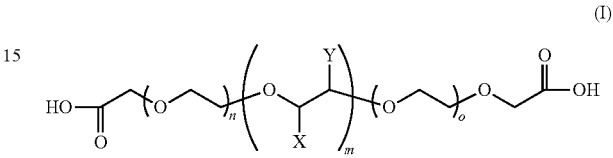

(I)

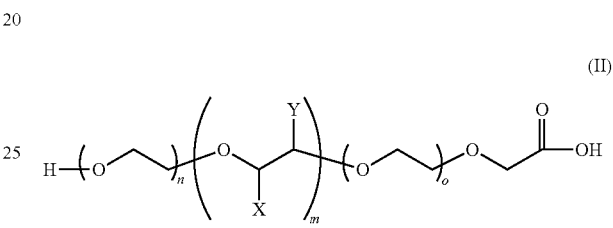

(II)

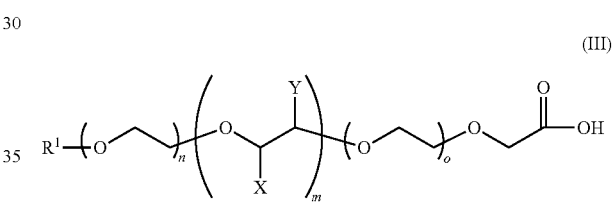

(III)

However, considerable amount of organic solvents is still used in the preparation processes of the conventional art. Therefore, how the aforementioned deficiencies can be overcome, for the purpose of manufacturing a water-compatible, solvent-free curing agent, and further providing curing products with good performance, has become one of the important issues to be solved.

SUMMARY OF THE DISCLOSURE

In response to the above-referenced technical inadequacies, the present disclosure provides a curing agent and a method of manufacturing the same for an aqueous epoxy resin coating.

In one aspect, the present disclosure provides a method for manufacturing a curing agent, including: an esterification step: mixing a polyhydric alcohol with a polyanhydride in an equivalent ratio of 1.1:1 for an esterification reaction to obtain an ester-based emulsifier (A); a chain extension reaction step: mixing the ester-based emulsifier (A) with a bifunctional epoxy resin in an equivalent ratio of 0.05:1 for a chain extension to obtain a polymer intermediate (B); and mixing and reacting the polymer intermediate (B) and a polyamine compound in an equivalent ratio of 0.2:1 to obtain a curing agent (C) having a formula of:

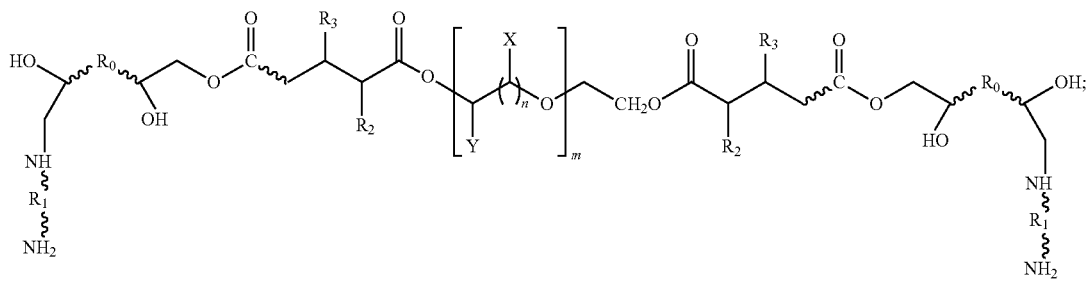

wherein m is from 1 to 100, n is from 1 to 15, X and Y are each independently selected from H, methyl, ethyl, and hydroxymethyl; $R_0$ is a C6-C30 hydrocarbon group having at least one aromatic ring, and substituted or unsubstituted with oxygen atom, nitrogen atom, sulfur atom, or a C6-C17 aliphatic hydrocarbon group; $R_1$ is a C2-C18 aliphatic, cycloaliphatic, or aromatic group that is unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

In certain embodiments, the polyol has a following chemical formula:

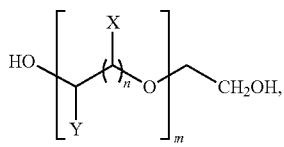

wherein m is from 1 to 100, n is from 1 to 15, X and Y are each independently selected from H, methyl, ethyl, and hydroxymethyl. Furthermore, the polyol may be polyethylene glycol (PEG), and can be selected from: PEG 200, PEG 400, PEG 1000, PEG 2000, PEG 3000, PEG 6000, and PEG 8000.

In certain embodiments, the polyanhydride is selected from a group consisting of succinic anhydride, maleic anhydride, phthalic anhydride, cyclohexanedicarboxylic anhydride, tetrahydrophthalic anhydride, and methylhexahydrophthalic anhydride.

In certain embodiments, the bifunctional epoxy resin is selected from a group consisting of bisphenol-type diglycidyl ether, branched or linear aliphatic glycidyl ether, epoxy phenolic resin, or alicyclic epoxy resin.

In certain embodiments, the polyamine compound is selected from a group consisting of m-xylylenediamine, 1,3-bis (aminomethyl) cyclohexane, 2-methyl-1,5-pentanediamine, 1,3-pentanediamine, ethylenediamine, diethylenetriamine, triethylenetetramine, polypropylene oxide diamine, 2,2 (4), 4-trimethyl 1,6-hexanediamine, isophorone diamine, 2,4-toluenediamine, 1,6-hexanediamine, 1,2-diaminocyclohexane and p-diaminodicyclohexylmethane (PACM).

In certain embodiments, the esterification step is reacted in a nitrogen atmosphere, the reaction temperature is between 110 and 130° C., and the reaction time is 3 hours.

In certain embodiments, the chain extension step further includes: reacting at a temperature of 110 to 130° C. for 1 hour, then reacting at a temperature of 130 to 150° C. for 2 hours.

In certain embodiments, the polymer intermediate (B) and the polyamine compound are reacting at 70° C. for 4 hours.

In certain embodiments, the method for manufacturing a curing agent further includes: reacting the hardening agent (C) and the monofunctional epoxy for an end-capping reaction, and mixing with deionized water to obtain an end-capping hardening agent (D) having a formula of:

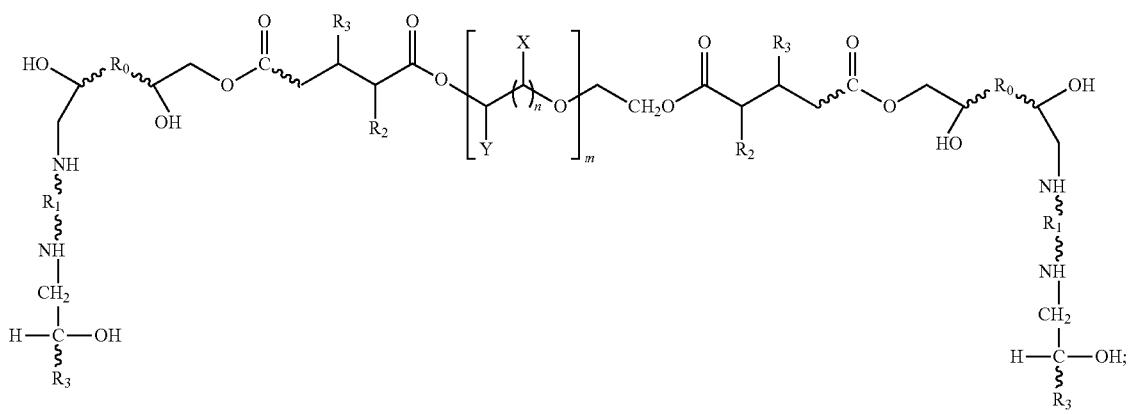

wherein $R_1$ is a C2-C18 aliphatic, cycloaliphatic, or aromatic group unsubstituted or substituted with non-reactive oxygen, or up to an average of 4 secondary or tertiary nitrogen atoms; wherein m is from 1 to 100, n is from 1 to 15, X and Y are each independently selected from H, methyl, ethyl, and hydroxymethyl; $R_2$ and $R_3$ are each independently selected from H, substituted or unsubstituted alkyl, substituted or unsubstituted aryl, or $R_2$ and $R_3$ are bonded to each other to form a substituted or unsubstituted ring; and $R_0$ is a C6-C30 hydrocarbon group having at least one aromatic ring, and substituted or unsubstituted with oxygen atom, nitrogen atom, sulfur atom, or a C6-C17 aliphatic hydrocarbon group.

In certain embodiments, the monofunctional epoxy compound is selected from a group consisting of 1,2-hexene oxide, 1,2-heptene oxide, iso-heptene oxide, 1,2-octene oxide, 1, 2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether.

In another aspect, the present disclosure provides a curing agent, which is made by the method of manufacturing the curing agent of the present disclosure.

Therefore, through steps and procedures and the specific proportion of the curing agent and the method of manufacturing the curing agent, the present disclosure provides a curing agent manufacturing method without additional addition of volatile organic compounds for manufacturing a water-compatible and solvent-free curing agent, and further provides curing products with good performance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
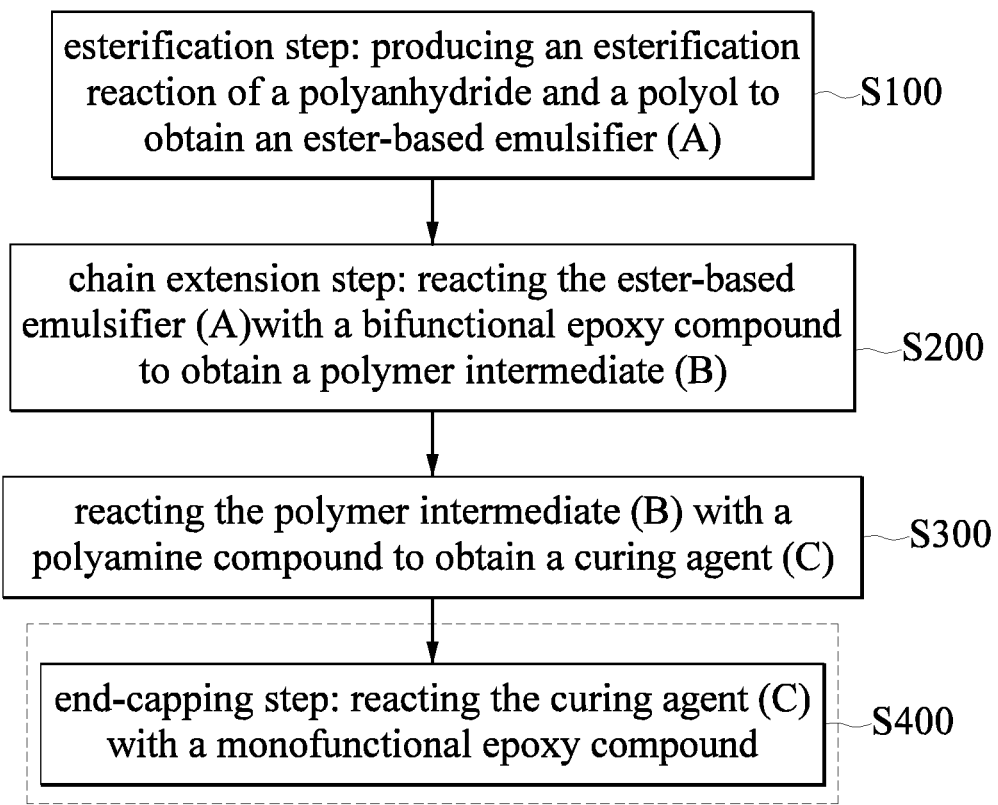
FIG. 1 is a flowchart of a method for manufacturing a curing agent of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a method for manufacturing a curing agent, including: step S100 (esterification step), producing an esterification reaction of a polyanhydride and a polyol to obtain an ester-based emulsifier; step S200 (chain extension step), reacting the ester-based emulsifier with a bifunctional epoxy compound to obtain a polymer intermediate; step S300, reacting the polymer intermediate with a polyamine compound to obtain a curing agent; and step S400 (end-capping step), reacting the curing agent with a monofunctional epoxy compound.

Specifically, in step S100, a polyol and a polyanhydride are mixed at a ratio of 1.1:1 in a nitrogen atmosphere, and reacted at a temperature between 110 and 130° C. for 3 hours to produce the esterification reaction between the polyol and the polyanhydride to obtain an ester-based emulsifier (A) having a chemical formula:

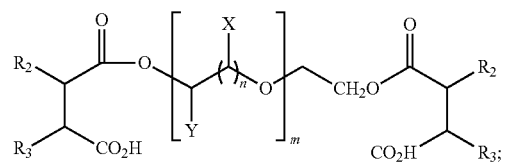

wherein m=1-100, n=1-15, X and Y are each independently selected from H, methyl, ethyl, and hydroxymethyl; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

Further, the polyol of the present disclosure has a following chemical formula:

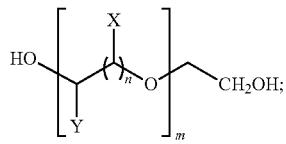

wherein m=1-100, n=1-15, X and Y are each independently selected from H, methyl, ethyl, and hydroxymethyl, preferably, the polyol polymer has a molecular weight between 200 and 8000, and more preferably, the polyol polymer being a polyethylene glycol with a molecular weight can be selected from: PEG200, PEG400, PEG 1000, PEG 2000, PEG 3000, PEG 6000 and PEG 8000.

Furthermore, the polyanhydride has a following chemical formula:

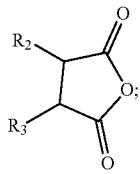

wherein $R_2$ and $R_3$ are each independently selected from H, substituted or unsubstituted alkyl, substituted or unsubstituted aryl, or $R_2$ and $R_3$ are bonded to each other to form a substituted or unsubstituted ring.

For example, the polyanhydride is selected from a group consisting of succinic anhydride (SA), maleic anhydride (MA), phthalic anhydride (PA), cyclohexanedicarboxylic anhydride (CDA), tetrahydrophthalic anhydride (TPA), and methylhexahydrophthalic anhydride (MHHPA).

S200 (chain extension step): the ester-based emulsifier (A) is mixed with a bifunctional epoxy resin to perform a chain extension reaction in an equivalent ratio of 0.05:1, and the reaction conditions of the chain extension step are firstly reacted at a temperature of 110 to 130° C. for 1 hour, then reacted at a temperature of 130 to 150° C. for 2 hours to obtain a polymer intermediate (B), which has a formula of:

etherification reaction of a hydroxyl group, glycidylation of primary or secondary amines, or glycidyl esterification of carboxylic acids. The bifunctional epoxy resin of the present disclosure has a following chemical formula:

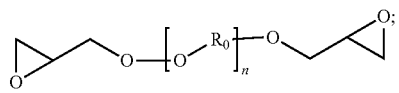

wherein n is a natural number, n=1-10, $R_0$ is a C6-C30 hydrocarbon group having at least one aromatic ring, and substituted or unsubstituted with oxygen atom, nitrogen atom, sulfur atom, or a C6-C17 aliphatic hydrocarbon group.

For example, the bifunctional epoxy resin may be selected from a group consisting of bisphenol-type diglycidyl ether, branched or linear aliphatic glycidyl ether, epoxy phenolic resin, or alicyclic epoxy resin.

Furthermore, a bisphenol-type diglycidyl ether can be produced by reacting an epihalohydrin with a bisphenol in the presence of a base. For example, the bisphenol can be selected from a group consisting of 2,2-bis (4-hydroxyphenyl) propane (bisphenol-A), 2,2-bis (4-hydroxy-3-tert-butylphenyl) propane, 1,1-bis (4-hydroxyphenyl) ethane, 1,1-bis (4-hydroxyphenyl) isobutane, bis (2-hydroxy-1-naphthyl) methane, 1,5-dihydroxy naphthalene and 1,1-bis (4-hydroxy-3-alkylphenyl) ethane.

The aliphatic glycidyl ether may be selected from 1,4-butanediol, neopentyl glycol, cyclohexanedimethanol, hexanediol, polypropylene glycol, and diol-like diglycidyl ether, trimethylol triglycidyl ether of trimethylol and trimethylolpropane. Examples of the alicyclic epoxy resins are:

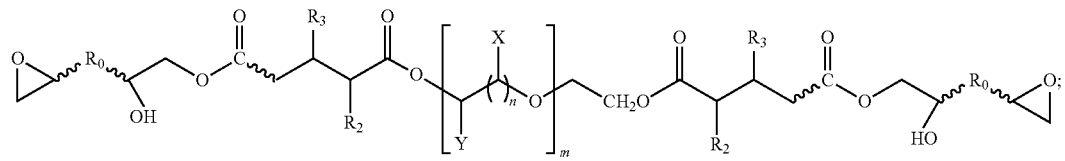

wherein $R_0$ is a C6-C30 hydrocarbon group having at least one aromatic ring, and is substituted or unsubstituted with oxygen atom, nitrogen atom, sulfur atom, or a C6-C17 aliphatic hydrocarbon group; m=1-100, n=1-15, X and Y are each independently selected from H, methyl, ethyl, and hydroxymethyl; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

The bifunctional epoxy resin refers to resin with two or more epoxy groups in one molecule, such as epoxy group formed by an oxidation reaction of an olefin, a glycidyl 3,4-epoxycyclohexylmethyl-(3,4-epoxy) cyclohexane carboxylate, dialicyclic diether diepoxy [2-(3,4-epoxy)cyclohexyl-5, 5-spiro(3,4-epoxy)-cyclohexane-m-dioxane], bis (3,4-epoxy-cyclohexylmethyl) hexyl diesters, bis (3,4-epoxy-cyclohexyl) adipate, and vinyl cyclohexene dioxide [4-(1,2-epoxyethyl)-1, 2-epoxy ring hexane].

Step S300: mixing the polymer intermediate (B) with the polyamine compound at an equivalent ratio of 0.2:1, and reacting the mixture at a temperature of 70° C. for 4 hours to obtain a hardening agent (C), which has a chemical formula of:

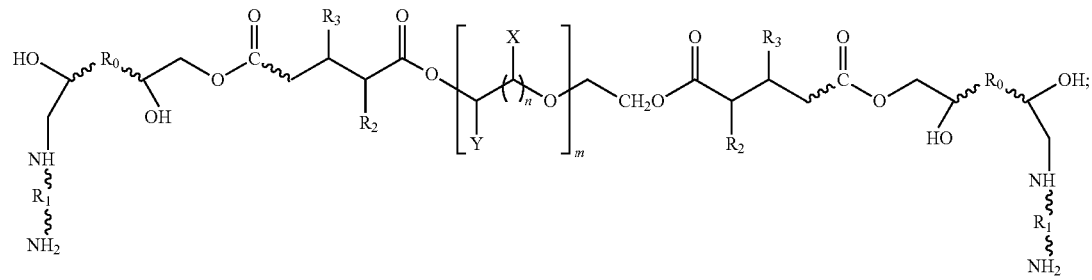

wherein m=1-100, n=1-15, X and Y are each independently selected from H, methyl, ethyl, and hydroxymethyl; $R_0$ is a C6-C30 hydrocarbon group having at least one aromatic ring and is substituted or unsubstituted with oxygen atom, nitrogen atom, sulfur atom, or is a C6-C17 aliphatic hydrocarbon group; $R_1$ is a C2-C18 aliphatic, cycloaliphatic, or aromatic group unsubstituted or substituted with non-reactive oxygen or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

Furthermore, the polyamine compound is selected from a group consisting of m-xylylenediamine, 1,3-bis (aminomethyl) cyclohexane, 2-methyl-1,5-pentanediamine, 1,3-pentanediamine, ethylenediamine, diethylenetriamine, triethylenetetramine, polypropylene oxide diamine, 2,2(4),4-trimethyl1,6-hexanediamine, isophorone diamine, 2,4-toluenediamine, 1,6-hexanediamine, 1,2-diaminocyclohexane and p-diaminodicyclohexylmethane (PACM).

In addition, step S400 (end-capping step) is optionally further performed. The hardening agent (C) and the monofunctional epoxy compound are reacted at 70° C. for 2 hours, then cooled to 60° C., and stirred with deionized water at a speed of 200 rpm for 1 hour to obtain a hardening agent (D) having a formula of:

with the epoxy functional group provides a secondary amine hydrogen that is more reactive with epoxy resins. Therefore, double advantages are obtained, that is, sufficient reactivity is maintained at room temperature without the presence of external catalyst to cure the system, while alleviating the whitening phenomenon. Reacting with the monofunctional epoxy compound further forms hydroxyl groups, which can also be used to react with epoxy components.

The monofunctional epoxy compound is selected from a group consisting of 1,2-hexene oxide, 1,2-heptene oxide, iso-heptene oxide, 1,2-octene oxide, 1,2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether.

First Embodiment

Under a nitrogen atmosphere, mixing 100 g of polyethylene glycol PEG6000 and 5.3 g of methylhexahydrophthalic anhydride (MHHPA), and reacting at 120° C. for 3 hours for an esterification reaction to obtain 105.3 g of ester-based emulsifier (A).

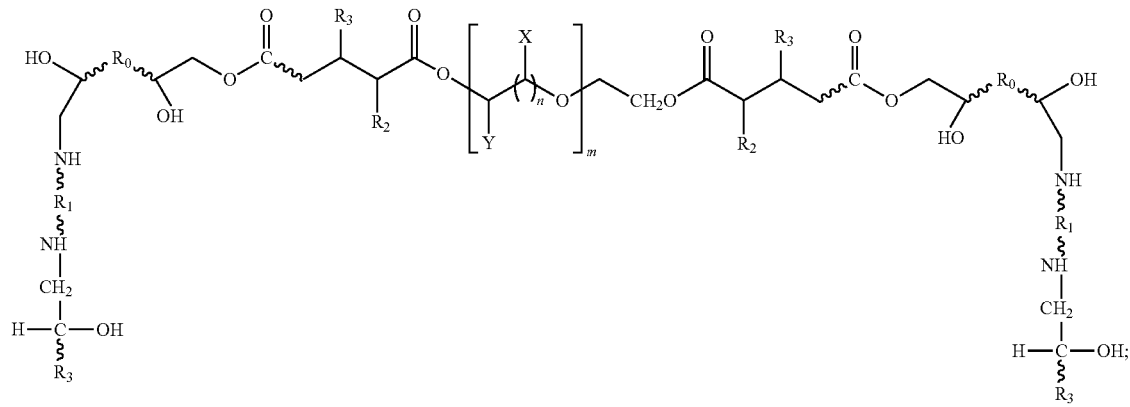

wherein $R_X$ is as shown in the aforementioned chemical formula ($R_0$ and $R_5$ are as described above), $R_1$ is a C2-C18 aliphatic, alicyclic or aromatic group substituted or unsubstituted by non-reactive active oxygen, or at most on average 4 secondary or tertiary nitrogen atoms; R3 is selected from a group consisting of branched or linear alkyl, alicyclic, polyoxyalkyl or alkenyl groups of 2 to 100 carbon atoms.

In more detail, the monofunctional epoxy compound as an end-capping agent may be an aliphatic, alicyclic, or aromatic compound attached to an epoxy functional group. The monofunctional epoxy allows the hydrogen reaction of the primary amine, thereby reducing the chance that the atmospheric temperature reacts with the hydrogen of the primary amine to form a carbamate. Reacting amide polyamines with the epoxy functional groups not only alleviates whitening phenomenon through depleting some or all of primary amine groups of substituted arylamide polyamines, but further has an advantage of providing a free amine hydrogen that is reactive with the epoxy groups. Nonetheless, reacting the primary amine on the amide-based polyamine compound Mixing 105 g of ester-based emulsifier (A) with 258 g of epoxy resin from Nanya Plastics NPEL-136 for chain extension reaction, and reacting at 120° C. for 1 hour, and then at 140° C. for 2 hours, to obtain a polymer intermediate (B).

Mixing 175 g of polymer intermediate (B) with excess diethylenetriamine (DETA), reacting at 70° C. for 4 hours, and removing excess DETA to obtain a curing agent (C).

Further, adding 55.6 g of n-butyl glycidyl ether (BGE) for an end-capping reaction, and reacting at 70° C. for 2 hours, and then lowering the temperature to 60° C., and adding 280 g of deionized water and stirring at a constant speed of 200 rpm for 1 hour, to obtain a curing agent (D).

Figure 2:
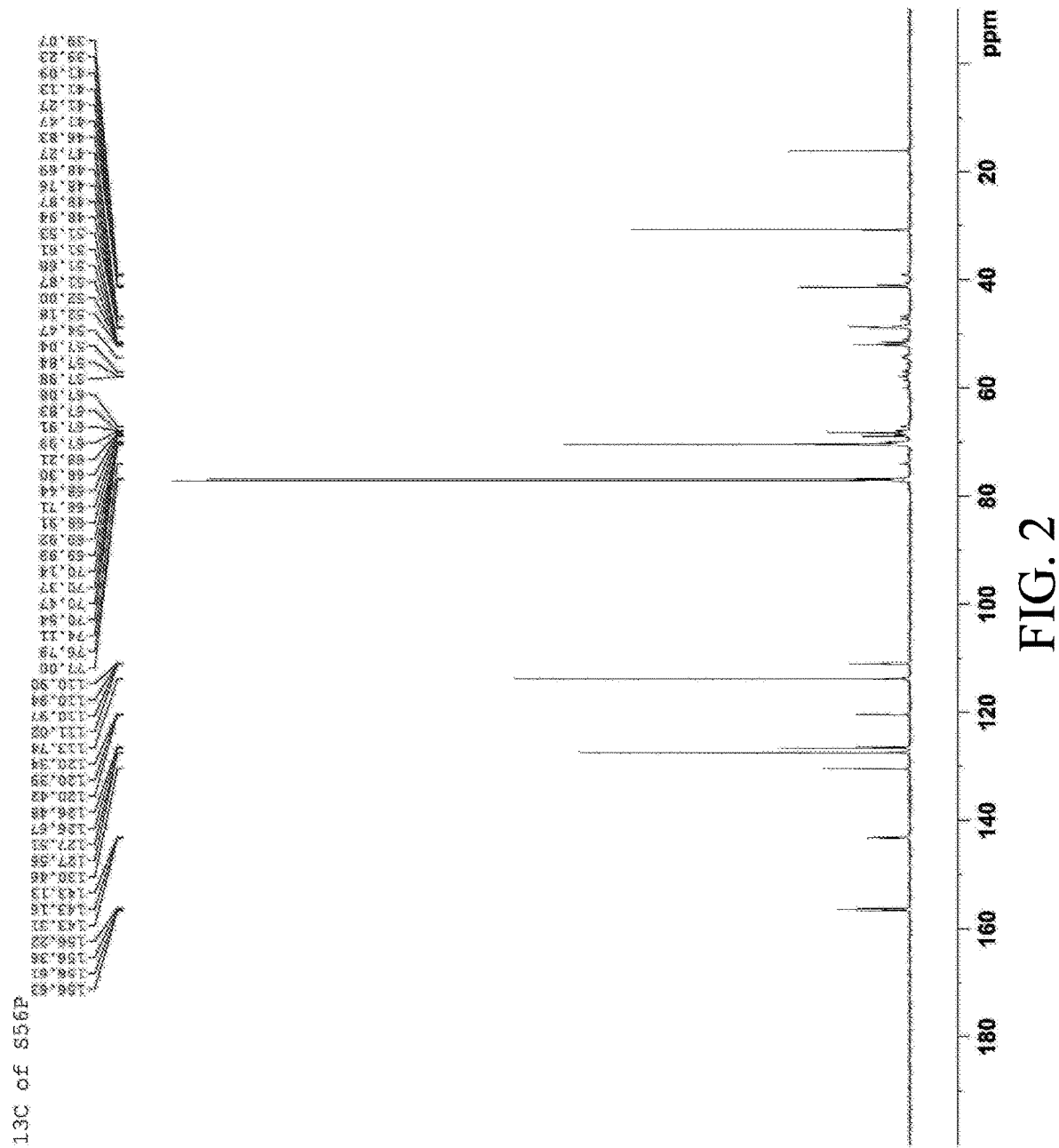
FIG. 2 is an NMR spectrum of a curing agent according to a first embodiment of the present disclosure.
Figure 3:
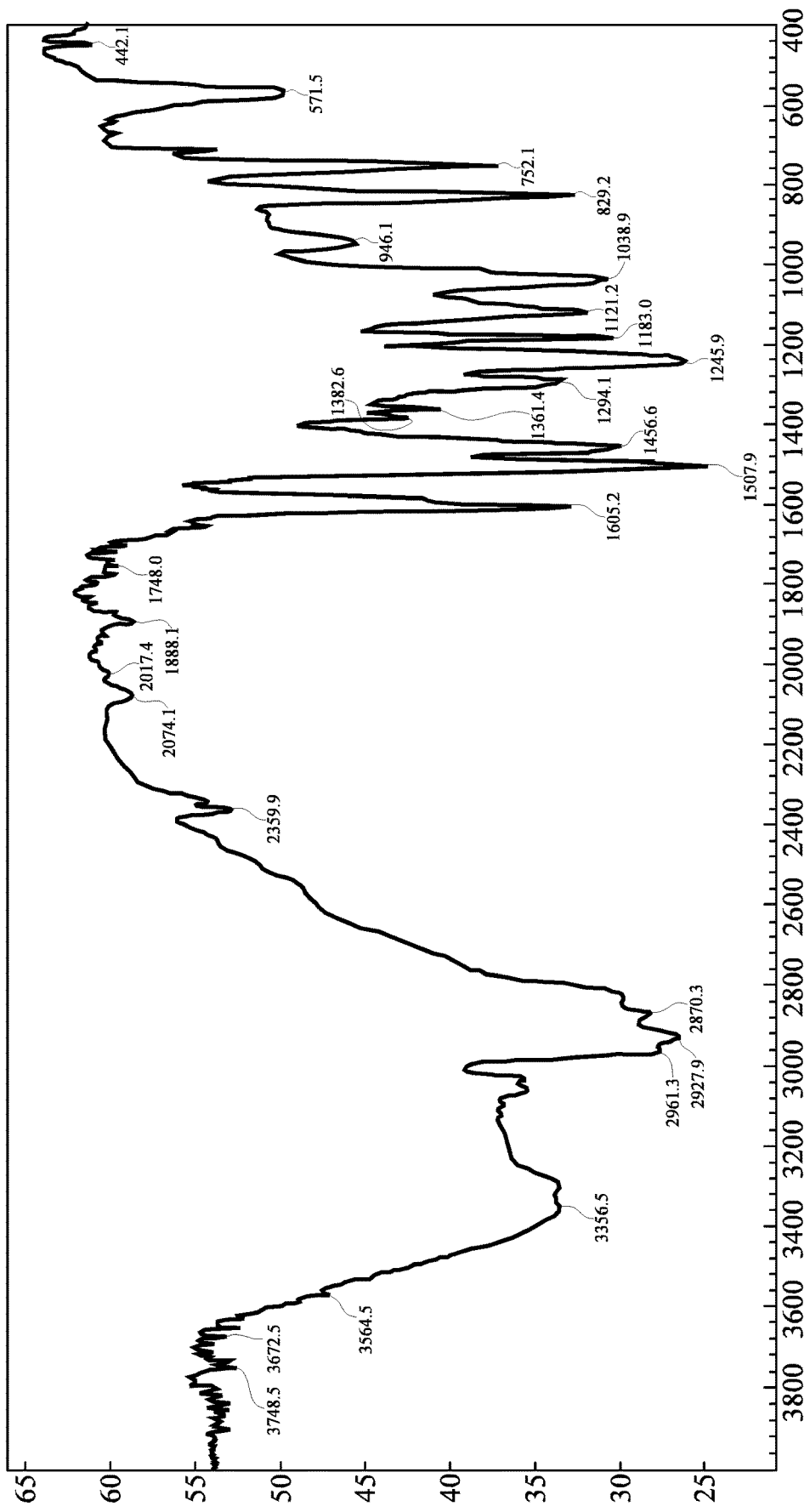
FIG. 3 is a FT-IR spectrum of the curing agent according to the first embodiment of the present disclosure.

The curing agent (D) obtained by the above reactions is further identified by NMR and FT-IR spectrum, as shown in FIG. 2 and FIG. 3.

In conclusion, through steps and procedures and the specific proportion of the curing agent and the method of manufacturing the curing agent, the present disclosure provides a curing agent manufacturing method without requiring the addition of extra volatile organic compounds, and a curing agent that is water-compatible and solvent-free, thereby providing curing products with good performance.

The curing agent provided by the present disclosure has a bifunctional epoxy resin structure which makes it more compatible with epoxy resins. Further, the curing agent of the present disclosure can effectively cure aqueous epoxy resins in a room temperature environment or at a heated temperature. Specifically, the aqueous epoxy resin may have a molecular weight of 350 to 10,000.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a curing agent without addition of volatile organic compounds, comprising:

an esterification step: mixing a polyhydric alcohol with a dicarboxylic acid anhydride in an equivalent ratio of 1.1:1 for an esterification reaction to obtain an ester-based emulsifier (A) having a formula of:

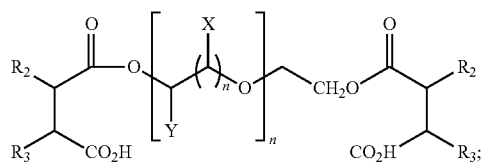

a chain extension reaction step: mixing the ester-based emulsifier (A) with a bifunctional epoxy resin in an equivalent ratio of 0.05:1 for a chain extension to obtain a polymer intermediate (B) having a formula of

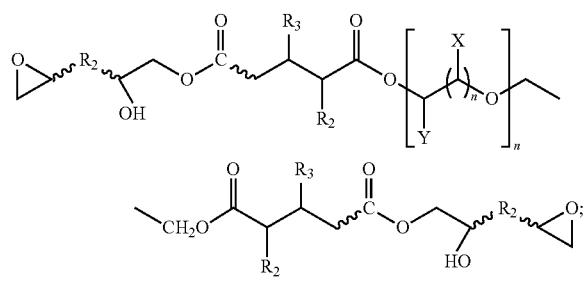

and mixing and reacting the polymer intermediate (B) and a polyamine compound in an equivalent ratio of 0.2:1 to obtain a curing agent (C) having a formula of:

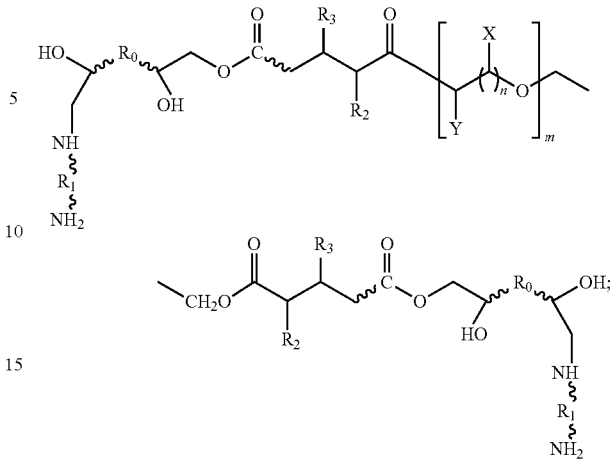

wherein m=1-100, n=1-15, X and Y are each independently selected from H, methyl, ethyl, and hydroxymethyl; $R_0$ is a C6-C30 hydrocarbon group having at least one aromatic ring, and substituted or unsubstituted with oxygen atom, nitrogen atom, sulfur atom, or a C6-C17 aliphatic hydrocarbon group; $R_1$ is a C2-C18 aliphatic, cycloaliphatic, or aromatic group that is unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring, wherein the curing agent is water-compatible and solvent-free.

2. The method according to claim 1, wherein the polyhydric alcohol has a formula of:

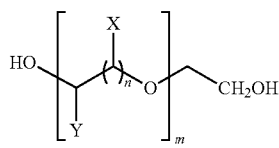

wherein m=1-100, n=1-15, X and Y are each independently selected from H, methyl, ethyl, and hydroxymethyl.

3. The method according to claim 1, wherein the dicarboxylic acid anhydride is selected from a group consisting of succinic anhydride, maleic anhydride, phthalic anhydride, cyclohexanedicarboxylic anhydride, tetrahydrophthalic anhydride, and methylhexahydrophthalic anhydride.

4. The method according to claim 1, wherein the bifunctional epoxy resin is selected from a group consisting of bisphenol-type diglycidyl ether, branched or linear aliphatic glycidyl ether, epoxy phenolic resin, and alicyclic epoxy resin.

5. The method according to claim 1, wherein the polyamine compound is selected from a group consisting of m-xylylenediamine, 1,3-bis (aminomethyl) cyclohexane, 2-methyl-1,5-pentanediamine, 1,3-pentanediamine, ethylenediamine, diethylenetriamine, triethylenetetramine, polypropylene oxide diamine, 2,2(4),4-trimethyl 1,6-hexanediamine, isophorone diamine, 2,4-toluenediamine, 1,6- hexanediamine, 1,2-diaminocyclohexane and p-diaminodicyclohexylmethane (PACM).

6. The method according to claim 1, wherein the esterification step is reacted in a nitrogen atmosphere, the reaction temperature is between 110 and 130° C., and the reaction time is 3 hours.

7. The method according to claim 1, wherein the chain extension step further includes: reacting the ester-based emulsifier (A) and the bifunctional epoxy resin at a temperature of 110 to 130° C. for 1 hour, and then reacting at a temperature of 130 to 150° C. for 2 hours.

8. The method according to claim 1, wherein the polymer intermediate (B) and the polyamine compound are reacted at 70° C. for 4 hours.

9. A curing agent made by the method of claim 1.

10. A method for manufacturing an end-capped curing agent comprising: preparing a curing agent according to the method of claim 1, reacting the curing agent (C) and a monofunctional epoxy compound for an end-capping reaction, and mixing with deionized water to obtain a curing agent (D) having a formula of:

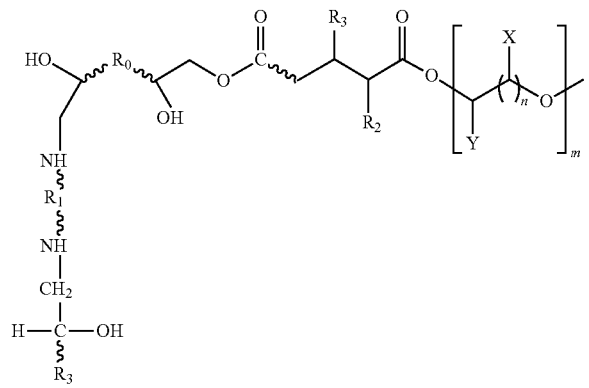

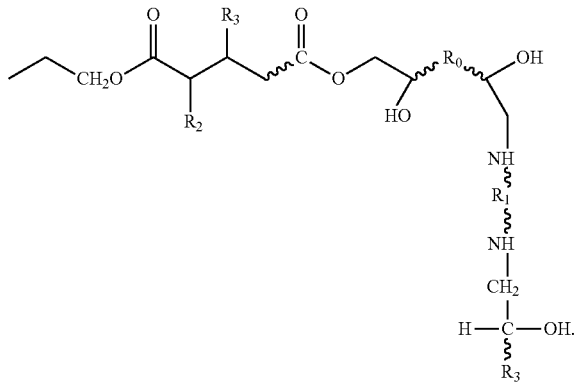

11. The method according to claim 10, wherein the monofunctional epoxy compound is selected from a group consisting of 1,2-hexene oxide, 1,2-heptene oxide, iso-heptene oxide, 1,2-octene oxide, 1,2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether.

12. A curing agent made by the method of claim 10.

* * * * *